US008923438B1

(12) United States Patent
Taft et al.

(10) Patent No.: US 8,923,438 B1
(45) Date of Patent: Dec. 30, 2014

(54) DUAL RATE COMMUNICATION

(75) Inventors: William J. Taft, Yardville, NJ (US);
Anthony Eddy, Newtown, PA (US);
George Silverman, Delray Beach, FL (US); James E. Bowe, Pottstown, PA (US); Harold D. Babb, Cupertino, CA (US); David O. Sieberns, San Jose, CA (US); Christopher C. Bianchi, Churchville, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 264 days.

(21) Appl. No.: 13/332,085

(22) Filed: Dec. 20, 2011

Related U.S. Application Data

(60) Provisional application No. 61/427,085, filed on Dec. 23, 2010.

(51) Int. Cl.
*H04L 27/20* (2006.01)

(52) U.S. Cl.
USPC ............ 375/308; 375/296; 375/298; 375/297

(58) Field of Classification Search
USPC .................................. 375/308, 296, 298, 297
See application file for complete search history.

(56) References Cited

U.S. PATENT DOCUMENTS 3,845,412 A * 10/1974 Rearwin et al. ............... 332/104
2006/0098759 A1 * 5/2006 Tiedemann et al. .......... 375/297

OTHER PUBLICATIONS

Langton, Charan, "Partial Response Signaling and Quadrature Partial Response (QPR) Modulation," Signal Processing and Simulation Newsletter, Tutorial 16, Jan. 2002, pp. 1-21.
Lender, Adam, "Correlative Level Coding for Binary-Data Transmission," IEEE Spectrum, Feb. 1966, pp. 104-115.
Anderson, Carl W., "Modulation Considerations for a 91 MBit/s Digital Radio," IEEE Transactions on Communications, May 1078, vol. Com-26, No. 5, pp. 523-528.
Proakis, et al., "Design of Band-Limited Signals With Controlled Partial-Response Signals," Digital Communications, Fifth Edition, 2008, pp. 609-619.
Sklar, Bernard, "Formatting and Baseband Modulation," Digital Communications Fundamentals and Applications, Second Edition, 2001, pp. 94-98.

* cited by examiner

*Primary Examiner* — Kabir A Timory
(74) *Attorney, Agent, or Firm* — McDermott Will & Emery LLP (57) ABSTRACT

A dual rate transmitter may include a modulator circuit configured to modulate orthogonal signals to generate a quadrature modulated signal. An amplifier may be configured to amplify the quadrature modulated signal to produce an amplified signal. A quadrature partial response (QPR) filter may be configured to process the amplified signal to generate an output signal. The QPR filter may allow for full rate QPR and half rate QPSK operation of the transmitter device. The output signal may be transmitted via an antenna. This transmitter approach provides a bandwidth efficiency improvement, as the QPR signal may be operated at twice the rate within the same bandwidth as the quadrature modulated signal using a common saturated transmitter implementation, reducing quantity of components and the resulting mass and cost reduction for a space transmitter solution. Additionally, this approach of using QPR signaling provides greater power efficiency.

20 Claims, 8 Drawing Sheets

DUAL RATE COMMUNICATION

CROSS-REFERENCE TO RELATED APPLICATIONS

This application claims the benefit of priority under 35 U.S.C. §119 from U.S. Provisional Patent Application 61/427,085 filed Dec. 23, 2010, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to radio communication and, more particularly, to dual rate communication.

BACKGROUND

Communication systems typically comprise transceivers, which in turn include transmitters and receivers. Transmitters may transmit signals at various power levels depending on the distance that the transmitted signal has to travel to reach one or more target receivers. Satellite communications, for example, may require transmission power levels of the order of tens to hundreds of watts, whereas transmitters for short distance applications may operate at a few watts or even milliwatts. High power transmitters may use high power amplifiers (HPAs) to increase the power levels of the transmitted signals to desirable levels for long distance transmission. Design of HPAs, especially for linear and low voltage operations is a challenging task.

Many transmitter devices use one or more modulation schemes in order to modulate a high frequency carrier waveform at a frequency of $\omega_c$ by one or more original signals (i.e., baseband signals) to generate a passband signal. The passband signal may have a spectrum that is nonzero in a band around $\omega_c$. Analog modulation may be implemented to modulate the amplitude (i.e., amplitude modulation (AM)), phase (i.e., phase modulation (PM)), or frequency (i.e., frequency modulation (FM)) of the carrier wave with the baseband signal. In digital modulation, the carrier frequency is modulated by a digital baseband signal. Digital modulation may offer several advantages over analog modulation and is more common in today's communication systems such as wireless systems. Digital modulations may include amplitude shift keying (ASK), phase shift keying (PSK), and frequency shift keying (FSK). Various modulation schemes may be characterized by different values of parameters, such as signal quality, spectral efficiency, and power efficiency. Many digital communication systems may benefit from quadrature modulation, in which a binary data stream may be subdivided into pairs of bits that can be impressed upon orthogonal carrier waveforms with the same frequency, such as $\sin \omega_c t$ and $\cos \omega_c t$ waveforms. Modulation schemes such as quadrature PSK (QPSK), offset QPSK (OQSK), QASK (also known as QAM) are commonly used in many communication systems.

Improvement in one or more of the parameters of interest, such as signal quality, spectral efficiency, or power efficiency in transmitters using the more popular QPSK modulation is desired.

SUMMARY

In some aspects, a dual rate transmitter is described. The dual rate transmitter may include a modulator circuit configured to modulate orthogonal signals to generate a quadrature modulated signal. An amplifier may be configured to amplify the quadrature modulated signal to produce an amplified signal. A quadrature partial response (QPR) filter may be configured to process the amplified signal to generate an output signal. The QPR filter may allow for full rate and half rate operations of the transmitter device. The output signal may be transmitted via an antenna.

In another aspect, a method for transmitting dual rate signals is described. The method includes modulating orthogonal signals to generate a quadrature modulated signal. The quadrature modulated signal may be amplified to produce an amplified signal. The amplified signal may be processed, using a QPR filter, to generate an output signal. The QPR filter may allow for both full rate and half rate transmission of signals. The amplified signal may be transmitted by an antenna.

In yet another aspect, a receiver for receiving dual rate signals is described. The receiver may include a matched quadrature partial response (QPR) filter that may be configured to allow for reception of high and low rate signals transmitted by a dual rate transmitter. A demodulator may be configured to demodulate at least one of the high rate or low rate signals to generate demodulated orthogonal signals. A detection module may be configured to process the demodulated orthogonal signals to recover baseband signals.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to a dual rate transmitter. A dual rate transmitter may include a modulator circuit such as a quadrature phase shift keying (QPSK) modulator circuit. The QPSK modulator may be configured to modulate orthogonal signals (e.g., inphase (I) and quadrature phase (Q) base band signals) to generate a quadrature modulated (e.g., I/Q modulated) signal. An amplifier (e.g., a high power amplifier (HPA)) may be configured to amplify the I/Q modulated signal to produce an amplified signal. A quadrature partial response (QPR) filter (e.g., a 9-state QPR (9QPR)) may be configured to process the amplified signal to generate an output signal. The output signal may be transmitted via an antenna.

The 9QPR filter may allow for full rate QPR and half rate QPSK operations of the transmitter device. This transmitter approach provides a bandwidth efficiency improvement, as the QPR signal may be operated at twice the rate within the same bandwidth as the quadrature modulated signal using a common saturated transmitter implementation, reducing quantity of components and the resulting mass and cost reduction for a space transmitter solution. Additionally, this approach of using QPR signaling provides greater power efficiency, i.e., less RF power is required for a given transmission data rate as compared to conventional QAM/APSK waveforms.

In an aspect, a receiver for receiving dual rate signals may include a matched QPR filter (e.g., 9QPR filter) that may be configured to allow for reception of high and low rate signals transmitted by a dual rate transmitter. A demodulator (e.g., a QPSK demodulator) may be configured to demodulate at least one of the high rate or low rate signals to generate demodulated orthogonal signals (e.g., I/Q signals). A detection module may be configured to process the demodulated I/Q signals to recover baseband I/Q signals.

Aspects of the subject technology may allow for doubling transmission rate of data transmitted from, for example, a space remote sensing or communications platform or an existing power constrained QPSK transmit system in the same radio frequency (RF) bandwidth, while maximizing the reuse of existing hardware. This dual rate transmitter technique may provide both a bandwidth and power efficient solution that may reuse existing QPSK modulator and HPA hardware and most QPSK receiver hardware. The bandwidth and power efficient solution may also provide both a twofold increase in data rate using a QPR (e.g., a 9QPR) signaling (QPRS) waveform as well as backward compatibility to legacy systems using QPSK. Additionally, an approach using RF waveform shaping may allow the operation of a HPA in saturation, enabling the use of a lower power HPA with improved RF power to direct current (DC) power efficiency as compared to RF transmitters using conventional bandwidth efficient modulation (BEM) waveforms.

According to various aspects of the subject technology, 9QPR filters may be inserted in existing QPSK systems, resulting in a two-fold data rate increase capability in the same bandwidth. In addition, the same 9QPR filters can be used to transmit half-rate (original QPSK rate) signals through the same RF chain with negligible degradation resulting from the filters. This design may be unique because the same filtering can be applied at both rates, which may eliminate the need for multiple RF paths, thereby saving on weight and cost. In some aspects, the design may provide a low-cost implementation of a transmit system that can support dual rates. In addition to bandwidth efficiency, the design may provide a more power efficient solution at lower complexity than comparable bandwidth efficient modulation (BEM) technologies, which may result in non-constant envelope signals into the HPA, requiring RF power backoff to minimize distortion.

Figure 1:
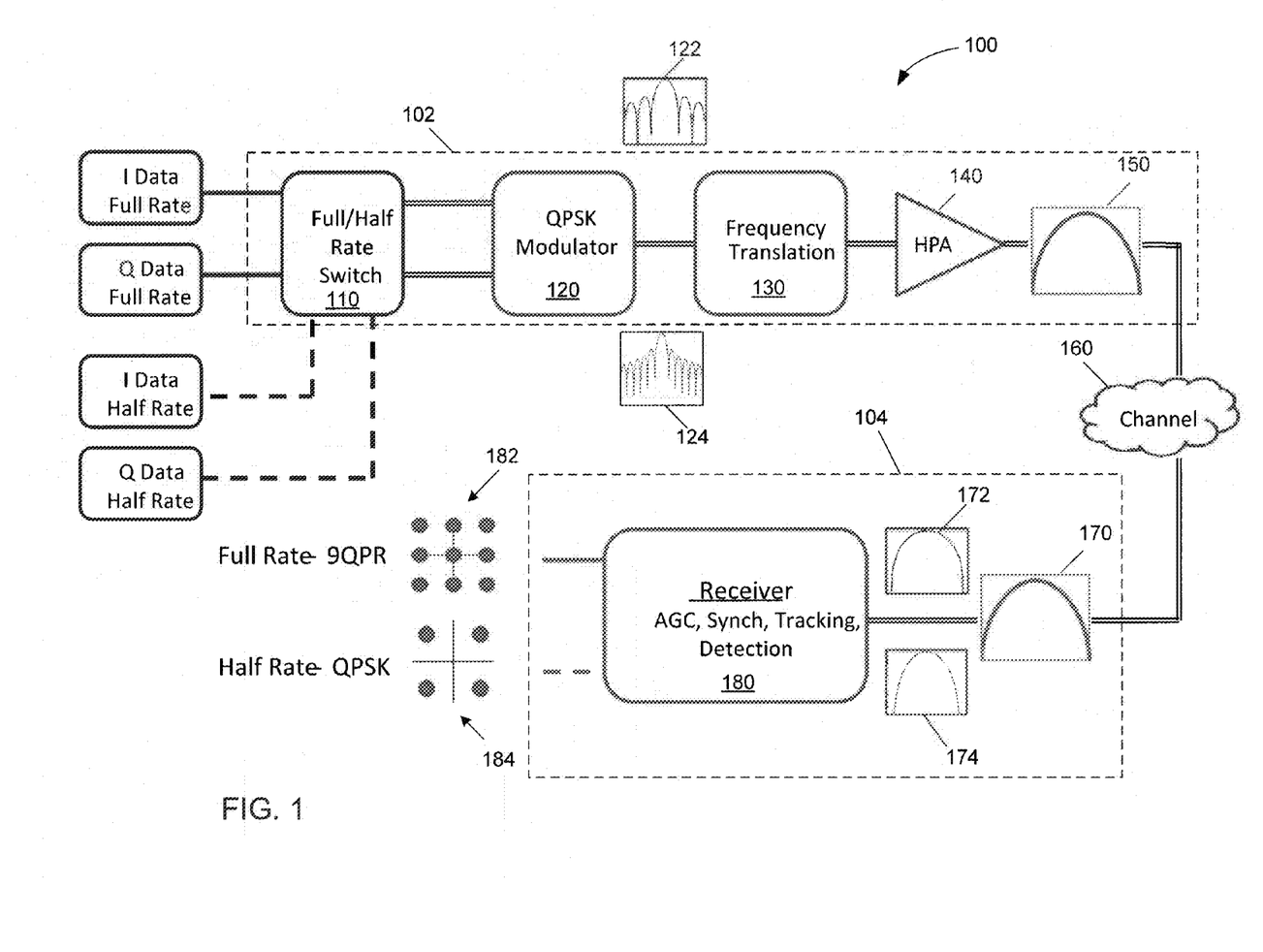
FIG. 1 is a block diagram illustrating an exemplary architecture of a dual rate communication device, according to certain embodiments.

FIG. 1 is a block diagram illustrating an exemplary architecture of a dual rate communication device 100, according to certain embodiments. The communication device 100 includes a transmitter 102 including a switch 110, a modulator 120, a frequency converter (e.g., frequency translator) 130, an amplifier 140, and a QPR filter 150. The transmitter 102 may be configured to transmit an output signal, via a transmission antenna (not shown in FIG. 1 for simplicity) to a channel 160. A receiver 104 of the communication device 100 may include a matched filter 170, and a receiver block 180. Transmitter 102 and receiver 104 of communication device 100 may include other modules or circuits implemented in hardware, firmware or software executable by one or more processors, which are not shown in FIG. 1 for simplicity and are not discussed herein for brevity.

Switch 110 comprises a half/full rate switch, which may select one of two sets of full rate I/Q or half rate I/Q baseband signals. The selected I/Q baseband signal may be provided to modulator 120. The full rate I/Q baseband signals may be provided at a rate of, for example, 800 Mbps (e.g., 400 Mbps in I channel and 400 Mbps in Q channel). The half rate I/Q baseband signal may be provided at rate of, for example, 400 Mbps (e.g., 200 Mbps in I channel and 200 Mbps in Q channel). In one aspect, modulator 120 may comprise a quadrature modulator (e.g., quadrature modulator 200 shown in FIG. 2). In other aspects, modulator 120 may comprise a QPSK modulator. Modulator 120 may modulate any of the sets of full rate I/Q or half rate I/Q baseband signals to generate a modulated signal. In some aspects, the modulation may comprise offset (e.g., staggered) modulation which may result in minimization of amplitude modulation. The modulated signal may have one of frequency spectra 122 or 124, depending on the I/Q signal that is modulated. Frequency spectrum 122 corresponds to the full rate and frequency spectrum 124 corresponds to the half rate I/Q signals. The frequency spectra 122 and 124 are centered at a carrier frequency $\omega_c$ of a modulation waveform used by modulator 120 to modulate I/Q baseband signals.

In some aspects, modulated signal 122 or 124 may be directly provided to amplifier 140 without using upconverter 130. In other aspects, especially for transmission at higher frequencies (18-100 GHZ) where greater RF bandwidth is available, the frequency upconverter 130 may be used to increase the frequency of carrier waveform of the modulated signal beyond the carrier frequency $\omega_c$. Amplifier 140 may comprise an HPA operating at a wide range of power levels, for example, 5-200 watts based on a number of transmission parameters (e.g., distance, antenna size, operating frequency, signal availability, etc.). In one aspect, an approach using RF waveform shaping may provide a constant envelope waveform at HPA 140, which may allow the operation of HPA 140 in saturation (e.g., at near zero dB back off). Operation of HPA 140 in saturation enables the use of a lower power amplifier with improved RF power to DC power efficiency as compared to RF transmitters using conventional bandwidth efficient modulation (BEM) waveforms.

Still referring to FIG. 1, QPR filter 150 may comprise a 9QPR filter, which allows dual rate operation of the communication device 100, both at full and half rates. The 9QPR filter 150 may provide partial shaping and spectrum limiting. More detailed description of 9QPR filter 150 may be discussed herein with respect to FIGS. 3A and 3B. Communication channel 160 may have several nonidealities. A radio signal propagating through communication channel 160 may experience both frequency- and time-dependent changes in propagation characteristics, such as dispersion and scattering. Dispersion, for example, introduces frequency-dependent group delay, which may distort the shape of the modulated symbols and cause intersymbol interference (ISI). Many receivers may use complex equalizers to reduce ISI in the received signal. The 9QPR filtering of the modulated signal in the present subject technology may control ISI and may eliminate the need for a complex equalizer.

In the receiver side, matched filter 170 may be matched to the 9QPR filter 150 so that it may have minimal impact on the half rate QPSK data and can provide final 9QPR shape signals. Signal shapes 172 and 174 correspond to the full rate and half rate signals, respectively, after passage through matched filter 170. Receiver bock 180 may include a demodulator, a detection module and a number of other known modules such as detection module, an automatic gain control (AGC) module, a tracking module, and a synchronizer module. The demodulator may comprise a quadrature demodulator, which demodulates the received signal into I and Q components. The detection module may process the demodulated I and Q signals to recover baseband signals. Constellations diagrams 182 and 184 correspond to the received full rate 9QPR and half rate QPSK signals. Constellations diagrams 182 and 184 are 9-state and 4-state constellations diagrams and indicate that the received signal symbols are correctly demodulated by receiver 104.

Figure 2:
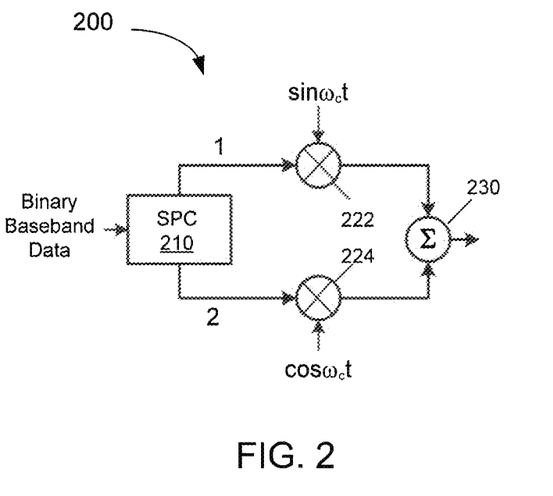
FIG. 2 is a block diagram illustrating an example of a quadrature modulator, according to certain embodiments.

FIG. 2 is a block diagram illustrating an example quadrature modulator 200, according to certain embodiments. Quadrature modulator 200 may be a simplified quadrature modulator and includes a serial-to-parallel converter (SPC) 210, a first mixer 222, a second mixer 224, and a summation block 230. SPC 210 separates consecutive bits of the input binary baseband data into streams 1 and 2, respectively, for the upper and lower arms of quadrature modulator 200. The symbol rate of each of the streams 1 and 2 are half of the bit rate of the input binary baseband data. In the upper arm, first mixer 222 modulates stream 1 with a sin $\omega_c t$ waveform to form the inphase (I) signal, whereas in the lower arm, second mixer 224 modulates stream 2 with a cos $\omega_c t$ waveform to form the quadrature phase (Q) signals. Summation block 230 adds the I and Q signals to form a quadrature modulated signal. The quadrature modulated signal may be expressed in the form of I sin $\omega_c t$+Q cos $\omega_c t$=A sin($\omega_c t+\phi$), where I and Q signals and phase angle $\phi$ may be time dependent. From the above equation, I and Q signals can be defined as: I=A cos $\phi$ and Q=A sin $\phi$, which indicate that I and Q signals carry amplitude and phase information of the quadrature modulated signal.

Figure 3A:
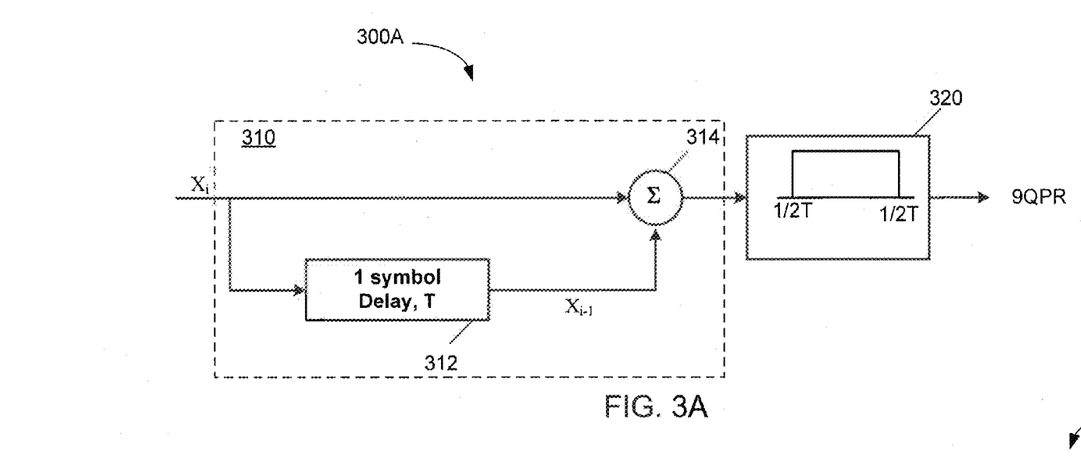
FIG. 3A is a block diagram illustrating an example of a processor for implementing a 9-state quadrature partial response (9QPR) filter, according to certain embodiments.

FIG. 3A is a block diagram illustrating an exemplary processor 300A for implementing a 9-state quadrature partial response (9QPR) filter 150 of FIG. 1, according to certain embodiments. Processor 300A may include a first filter 310 and a second filter 320. First filter 310 may be implemented by using a Delay block 312 and a summation block 314. Delay block 310 delays the input symbol $X_i$ by one symbol time T to generate the delayed symbol $X_{i-1}$. The summation block 320 adds the input symbol $X_i$ and the delayed symbol $X_{i-1}$ to form $X_i+X_{i-1}$. A transfer function of the first filter is given as:

$$|H_1(f)|=1+e^{-j\omega t}=1+e^{-j2\pi fT}=2\cos(\omega T/2)e^{-j\omega T/2} \quad (1)$$

where $\omega=2\pi f$. Second filter 320 represents a brick wall filter with the following transfer function:

$$|H_2(f)| = \begin{cases} T & |f| < \frac{1}{2T} \\ 0 & \text{else} \end{cases} \quad (2)$$

The overall transfer function H(f) of processor 300A is the product of the above transfer functions (1) and (2):

$$|H(f)| = |H_1(f)| \cdot |H_2(f)| = \begin{cases} \frac{1}{T}\cos(\pi fT) & |f| < \frac{1}{2T} \\ 0 & \text{else} \end{cases} \quad (3)$$

which shows a cosine shape (see 150 in FIG. 1) between cutoff frequencies represented by $-\frac{1}{2}T$ and $+\frac{1}{2}T$. Note that in derivation of H(f) of equation (3), the complex exponential function $e^{-j\omega T/2}$ of equation (1) is not used. The multiplication by this complex exponential function in frequency domain merely shifts the spectrum to sides (e.g., right or left) and has no impact on the amplitude of H(f).

Theoretically, more common pulse shaping schemes, such as raised-cosine shaping, can provide similar bandwidth efficiency as the QPSK/9QPR concept implemented by using processor 300A. However, common pulse shaping filters, such as raised-cosine filter, may not achieve the maximum bandwidth efficiency that 9QPR provides. Typical roll-off factors in raised-cosine filter may be 0.2 or greater, indicating larger bandwidth. Another disadvantage of the common pulse shaping schemes may be the large peak to average power ratio (PAPR), which may require back-off of the HPA (e.g., HPA 140 of FIG. 1). Predistortion techniques can be used in lieu of HPA back-off, but at the expense of increased complexity. The QPSK/9QPR implementation can be operated with HPA 140 in saturation and may not require complex predistortion techniques. The QPSK/9QPR concept may provide the best trade off of improved bandwidth and power efficiency with the least implementation complexity, while maximizing reuse of conventional constant envelope QPSK transmitter hardware (reducing non-recurring engineering (NRE)).

Figure 3B:
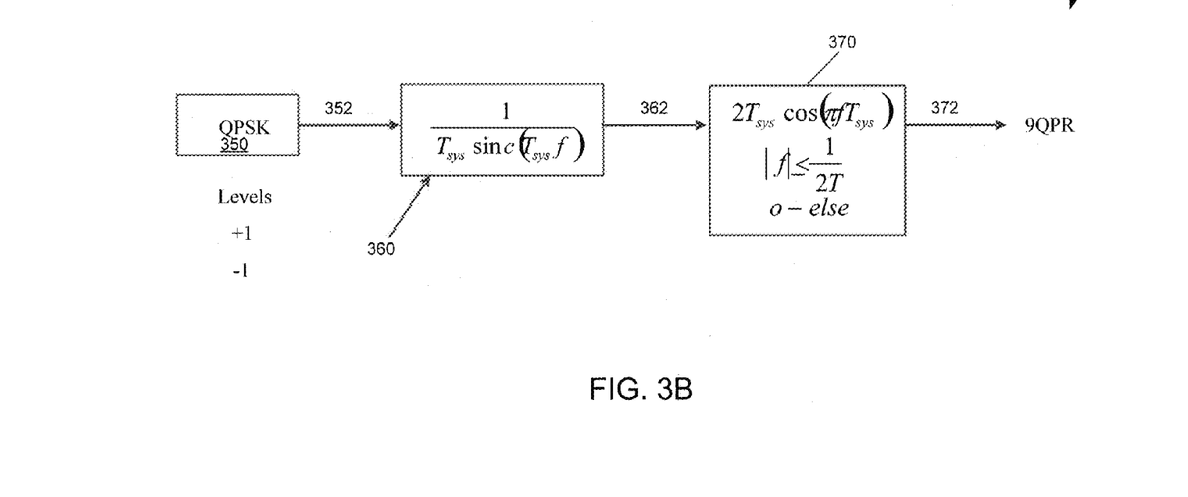
FIG. 3B is a block diagram illustrating an example of a processor for converting a QPSK modulated signal to a 9QPR modulated signal, according to certain embodiments.

FIG. 3B is a block diagram illustrating an exemplary processor 300B for converting a QPSK modulated signal 352 to a 9QPR modulated signal 372, according to certain embodiments. The QPSK modulator 350 generates signals with amplitudes between +1 and −1. The time domain representation of modulated signal 352 may include a rect function (e.g., rect (t/$T_{sys}$)), which when converted to frequency domain (e.g., by using Fourier Transform) includes a sinc function term, for example, in the form of $T_{sys}$ Sinc($Ts_{ys}f$). Filter 360 has a transfer function represented by 1/($T_{sys}$ Sinc($Ts_{ys}f$)). Filtered signal 362, can thus be expressed in frequency domain as:

$T_{sys}$ Sinc($Ts_{ys}f$)×1/($T_{sys}$ Sinc($Ts_{ys}f$))=1, which, when processed by 9QPR filter 370 generates a 9QPR signal 372. In some embodiments, filter 360 may be combined by the 9QPR filter 370 and used as 9QPR filter 150 of FIG. 1.

According to certain aspects, the QPSK/9QPR dual rate modulator technique (e.g., implemented by communication device 100 of FIG. 1) may be an easily realized implementation of the Nyquist output filtering technique. General Nyquist output filters may create uncontrolled intersymbol interference (ISI) that may necessitate a complex equalizer in the receiver. In some aspects, the 9QPR filters may generate controlled ISI that may not require a complex receiver equalizer. In addition, because of a smooth frequency response roll-off, 9QPR filters can be synthesized more easily and at a lower cost than many other Nyquist filters. Furthermore, the QPSK/9QPR technique may allow half-rate QPSK transmission through the same RF chain. This provides a cost-effective approach to implement a two-fold increase in transmitted (e.g., from a spacecraft) data rate with backward compatibility to existing/legacy ground station receivers.

Figure 3C:
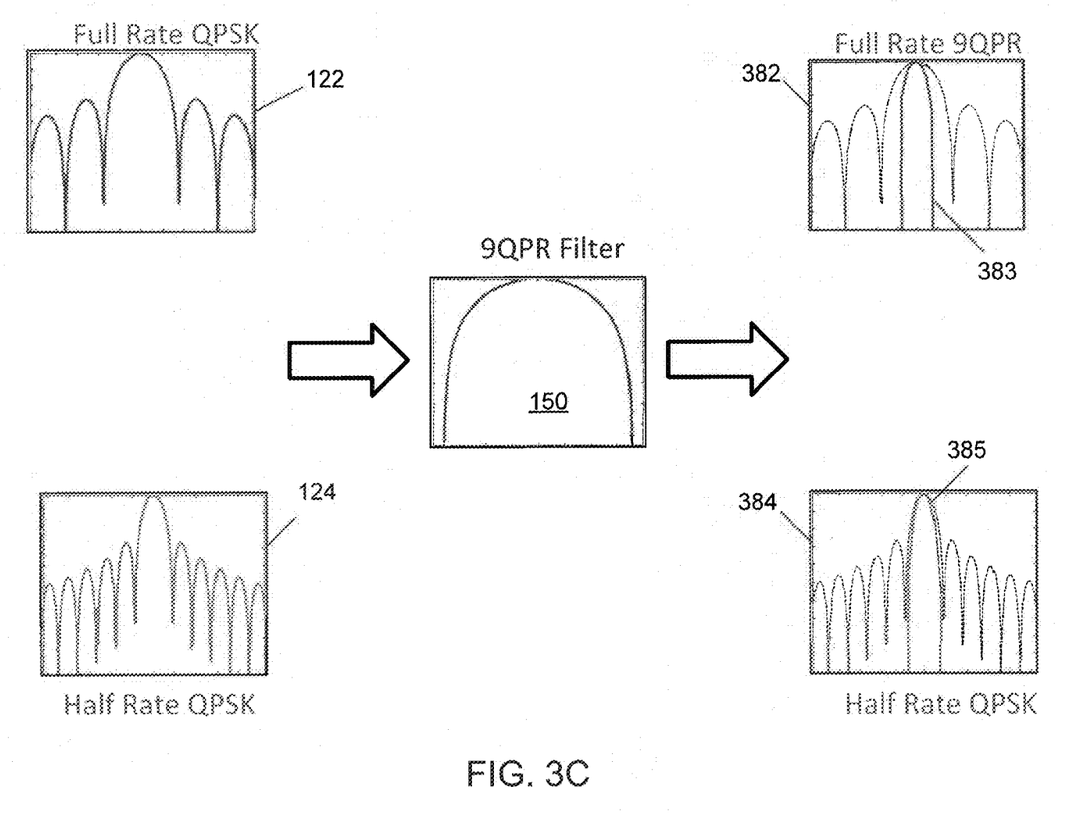
FIG. 3C is a block diagram illustrating an exemplary modification of spectra of modulated full rate and half rate signals by a 9QPR filter, according to certain embodiments.

FIG. 3C is a block diagram illustrating an exemplary modification of spectra of modulated full rate and half rate signals 122 and 124 of FIG. 1 by a 9QPR filter 150 of FIG. 1, according to certain embodiments. Spectra 122 and 124 of modulated full rate and half rate signals, after passing through 9QPR filter 150 may be modified. The modified spectra may resemble spectra 382 and 384, respectively. In modified spectrum 382 side lobes and a portion (e.g., half) of the main lobe of the spectrum are filtered out by 9QPR filter 150 and only portion 383 of the main lobe may be preserved. In modified spectrum 384 only side lobes of the spectrum may be filtered out by 9QPR filter 150 and the entire main lobe 385 of the spectrum may be preserved. Considering that the frequency of full rate signal is twice the frequency of half rate signal, the width of portion 383 is the same as the width of entire main lobe 385.

Figure 4:
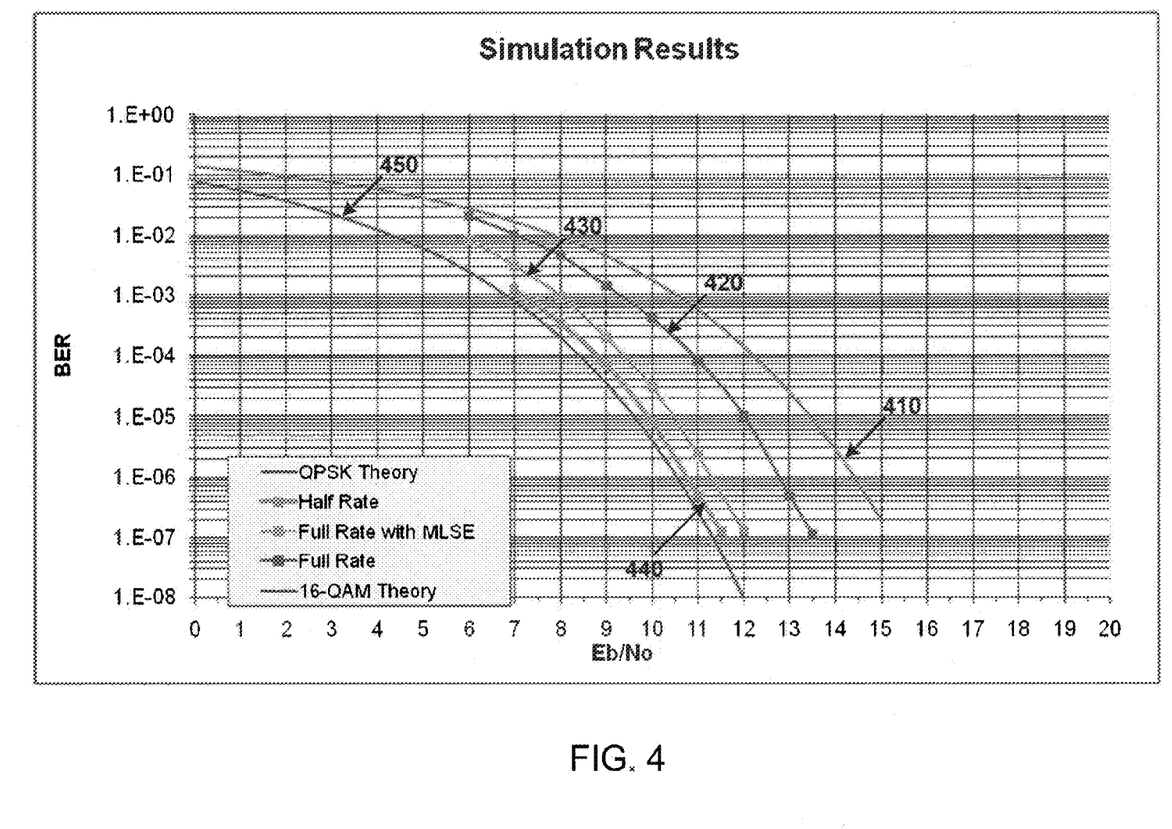
FIG. 4 is a diagram illustrating an exemplary comparison between bit error rate (BER) resulting from various modulation schemes, according to certain embodiments.

FIG. 4 is a diagram illustrating an exemplary comparison between bit error rate (BER) resulting from various modulation schemes, according to certain embodiments. Curves 410, 420, 430, 440, and 450 represent BER variation versus signal-to-noise ratio (SNR, e.g., $E_b/N_0$), respectively, corresponding to theoretical 16-quadrature amplitude modulation (16-QAM), full rate 9QPR, full rate with maximum likelihood sequence estimation (MLSE), half rate 9QPR, and theoretical QPSK. As seen from the curves 410-450, 9QPR, in general, has better BER performance than the theoretical 16-QAM. With MLSE, 9QPR results may be approximately less than 1 dB apart from the theoretical QPSK. Without MLSE, 9PQR may be approximately less than 2.3 dB away from theoretical QPSK. Half rate QPR shows a slight (e.g., 0.3 dB) degradation over the theoretical QPSK.

A QPSK/16-QAM (APSK) implementation can achieve the same bandwidth efficiency as the subject technology, but may require a new modulator for the 16-QAM (APSK) and a larger high power amplifier (HPA) compared to 9QPR implementation. Pulse shaping (such as raised-cosine) can be implemented at baseband (analog or digital) to achieve variable bandwidth efficiency up to that of 9QPR. However, pulse shaping may require a larger high power amplifier (HPA) to account for output back-off.

According to various aspects of the subject technology, a dual rate QPSK/9QPR solution may provide equivalent bandwidth efficiency as an unfiltered QPSK/16-QAM (APSK) solution, but provides greater power efficiency. Filtered APSK waveforms can provide higher bandwidth efficiencies, but with additional envelope variation and distortion. In some aspects, 9QPR needs 1.8 dB less $E_b/N_o$ at a $10^{-6}$ bit error rate (BER). The dual rate QPSK/9QPR solution may also allow HPA operation at saturation. In comparison, a typical 16-QAM (APSK) solution may require 3-6 dB of HPA RF power output back-off. The 9QPR waveform shaping results in an HPA RF power loss of 2.5 dB. This results in a net improvement of greater than 2 dB combined RF power advantage of post HPA output filtered 9QPR over 16-QAM, without the need for predistortion or linearization.

Figure 5:
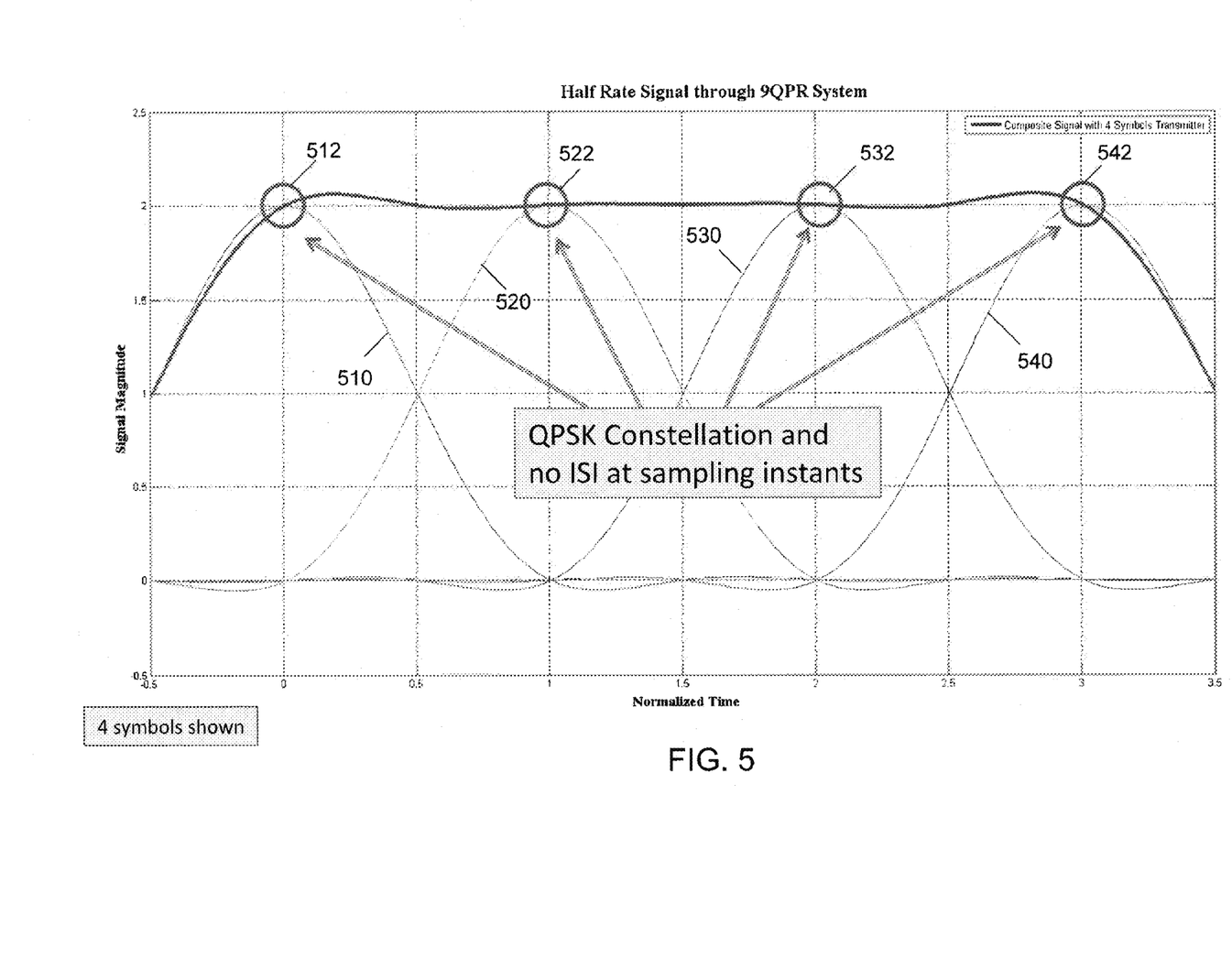
FIG. 5 is a diagram illustrating exemplary waveforms of four symbols of a half rate signal of the transmitter of FIG. 1, according to certain embodiments.

FIG. 5 is a diagram illustrating exemplary waveforms of four symbols of a half rate signal of transmitter 102 of FIG. 1, according to certain embodiments. Waveforms 510, 520, 530, and 540 corresponding to four symbols of a half rate QPSK signal that may pass through a 9QPR filter (e.g., 9QPR filter 150 of FIG. 1). The amplitude and phase information at peaks 512, 522, 532 and 542 of waveforms 510-540 may be used to form a QPSK constellation with no ISI at sampling instants.

Figure 6:
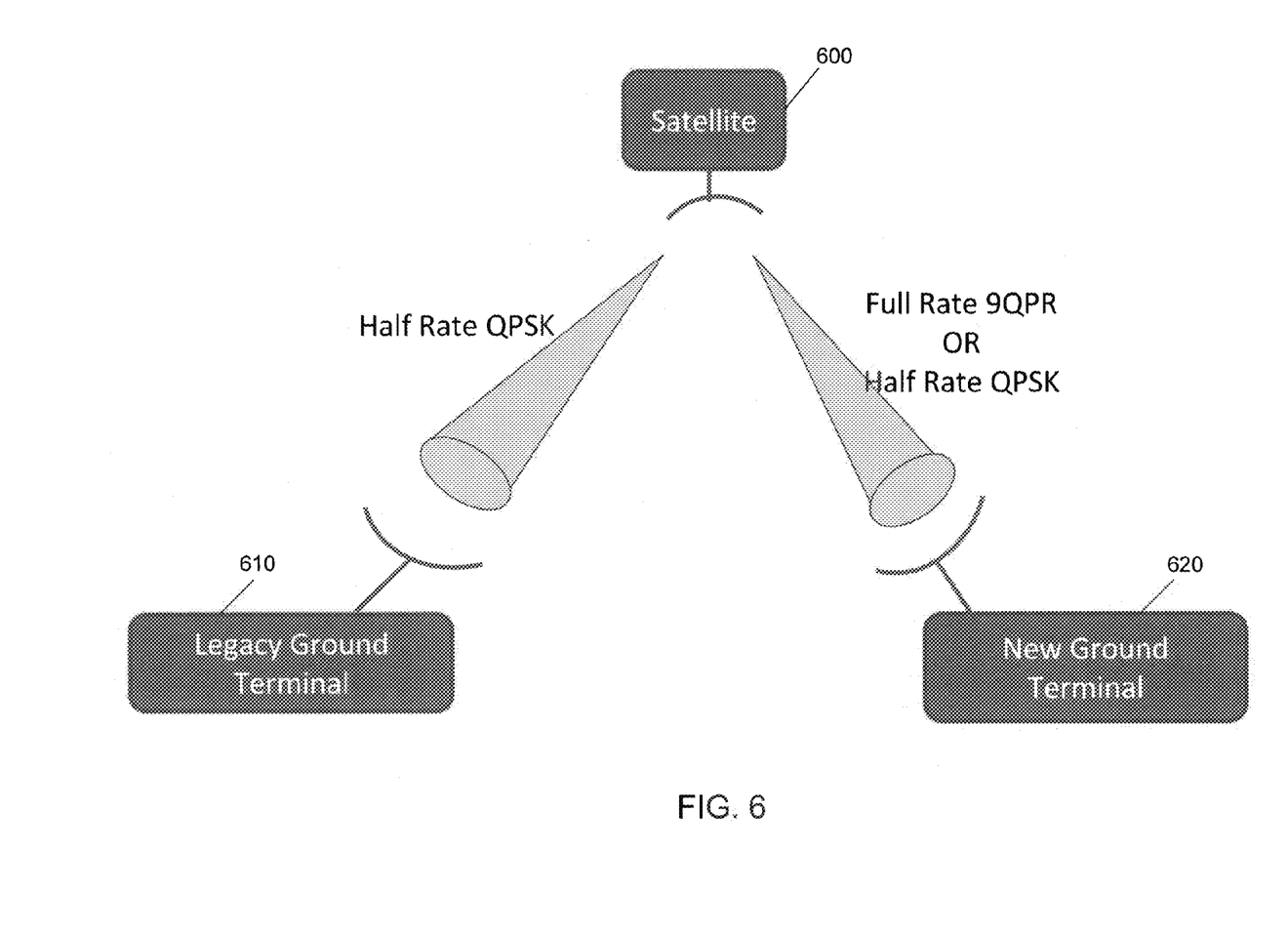
FIG. 6 is a diagram illustrating an example dual rate satellite transmitter, according to certain embodiments.

FIG. 6 is a diagram illustrating an example dual rate satellite transmitter, according to certain embodiments. Satellite transmitter 600 may comprise a dual rate transmitter (e.g., transmitter 102 of FIG. 1). Satellite transmitter 600 may transmit at full rate 9QPR or half rate QPSK when communicating with a ground terminal 620, which is 9QPR enabled (e.g., has similar structure as receiver 104 of FIG. 1). When communicating to a legacy (e.g., not 9QPR enabled) terminal 610, satellite transmitter 600 may have the option of transmitting only half rate QPSK signal. This indicates that satellite transmitter 600 is able to take advantage of improved higher bandwidth efficiency and power efficiency of the disclosed technology, while still being able to communicate with legacy receivers such as terminal 610.

Figure 7:
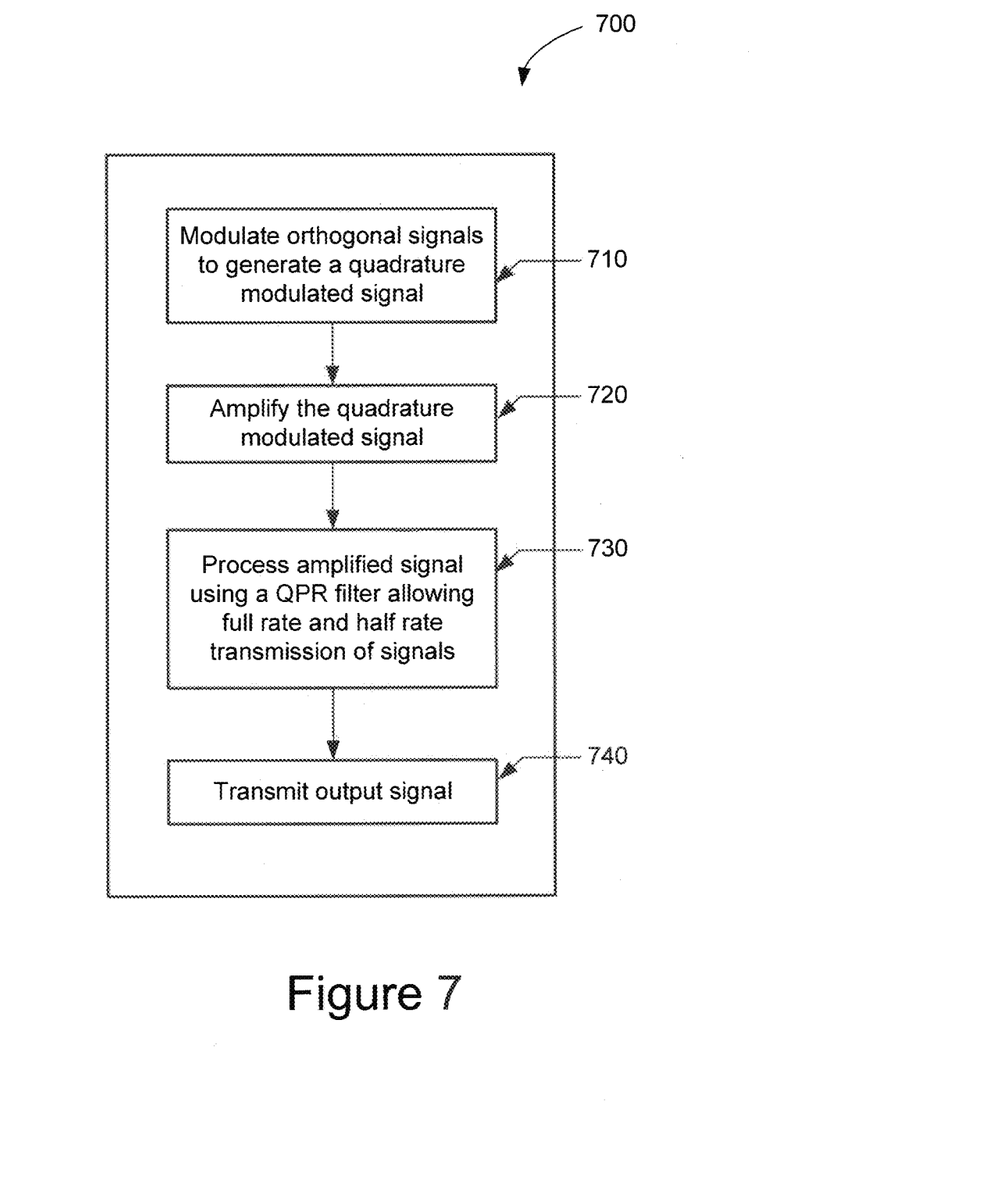
FIG. 7 is a flow diagram illustrating a method for transmitting dual rate signals, according to certain embodiments.

FIG. 7 is a flow diagram illustrating a method 700 for transmitting dual rate signals. Method 700 includes using modulator 120 of FIG. 1 to modulate orthogonal signals (e.g., I/Q signals) to generate quadrature modulated signals (e.g., signals 122 and 124 of FIG. 1) (710). The quadrature modulated signal may be amplified by HPA 140 of FIG. 1 to produce an amplified signal (720). The amplified signal may be processed, using a QPR filter 150 of FIG. 1, to generate an output signal as discussed above with respect to FIGS. 3A-3B (730). The QPR filter 150 may allow for both full rate and half rate transmission of signals, as described with regard to FIG. 3C. The amplified signal may be transmitted by an antenna (as described with regard to FIG. 1) via communication channel 160 of FIG. 1 (740).

In some aspects, the subject technology is related to correlative coding. In some aspects, the subject technology may be used in various markets, including for example and without limitation, data transmission and communications markets.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed embodiments, one having ordinary skill in the art will readily appreciate that these embodiments are only illustrative of the invention. It should be understood that various modifications can be made without departing from the spirit of the invention. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A transmitter device, for dual rate transmission of signals, comprising:
   a modulator circuit configured to modulate orthogonal signals to generate a quadrature modulated signal;
   an amplifier configured to amplify the quadrature modulated signal to produce an amplified signal;
   a quadrature partial response (QPR) filter configured to process the amplified signal to generate an output signal, wherein the output signal includes both full rate and half rate signals, and wherein the QPR filter comprises a 9QPR filter configured to truncate side lobes of a frequency spectrum associated with a half rate signal; and
   an antenna configured to transmit the output signal.

2. The transmitter device of claim 1, further comprising a switch circuit configured to receive full rate and half rate orthogonal signals and to selectively provide at least one of the full rate or half rate orthogonal signals to the modulator circuit.

3. The transmitter device of claim 2, wherein the orthogonal signals comprise inphase (I) and quadrature phase (Q) baseband signals.

4. The transmitter device of claim 1, further comprising an upconverter configured to upconvert a carrier frequency of the quadrature modulated signal.

5. The transmitter device of claim 1, wherein the modulator circuit is configured as a quadrature phase shift keying (QPSK) modulator to be compatible with both full rate and half rate signals, and wherein the modulation includes offset modulation that reduces amplitude modulation.

6. The transmitter device of claim 5, wherein the 9QPR filter is implemented as at least one of a cosine filter configured to generate a 9-state QPR (9QPR) constellation or matched root-cosine filters configured on transmit and receive paths to generate the 9QPR constellation.

7. The transmitter device of claim 6, wherein the 9QPR filter is further configured to include a sine function correction.

8. The transmitter device of claim 6, wherein the 9QPR filter is configured to have minimal impact on the half rate signal.

9. The transmitter device of claim 6, wherein the 9QPR filter is configured to truncate side lobes and a portion of a main lobe of a frequency spectrum associated with the full rate signal.

10. The transmitter device of claim 1, wherein the amplifier is configured as a high power amplifier (HPA) at near zero-dB RF power output back off (OBO).

11. A method, for transmitting dual rate signals, comprising:
   modulating orthogonal signals to generate a quadrature modulated signal, wherein generating the quadrature modulated signal comprises truncating side lobes of a frequency spectrum associated with a half rate signal;
   amplifying the quadrature modulated signal to produce an amplified signal;
   processing the amplified signal, using a quadrature partial response (QPR) filter, to generate an output signal, the output signal including both full rate and half rate signals; and
   transmitting the output signal.

12. The method of claim 11, further comprising receiving orthogonal signals at both full rate and half rate and to selectively delivering at least one of the full rate or half rate orthogonal signals to the modulator circuit.

13. The method of claim 11, further comprising upconverting a carrier frequency of the quadrature modulated signal.

14. The method of claim 11, further comprising generating the quadrature modulated signal having a 9-state QPR (9QPR) constellation.

15. The method of claim 14, wherein generating the quadrature modulated signal comprises truncating side lobes and a portion of a main lobe of a frequency spectrum associated with the full rate signal.

16. A communication system comprising:
   a transmitter device configured to transmit dual rate signals, the transmitter comprising:
      a modulator circuit configured to modulate orthogonal signals to generate a quadrature modulated signal; and
      a quadrature partial response (QPR) filter configured to process the quadrature modulated signal to generate an output signal, wherein the output signal includes both full rate and half rate signals, and wherein the QPR filter comprises a 9QPR filter configured to truncate side lobes of a frequency spectrum associated with a half rate signal.

17. The communication system of claim 16, wherein the transmitter further comprises a switch circuit configured to receive full rate and half rate orthogonal signals and to selectively provide at least one of the full rate or half rate orthogonal signals to the modulator circuit.

18. The communication system of claim 16, wherein the transmitter further comprises:
   an amplifier configured to amplify the quadrature modulated signal prior to processing by the QPR filter; and
   an antenna configured to transmit the output signal.

19. The transmitter device of claim 16, wherein the modulator circuit is configured as a quadrature phase shift keying (QPSK) modulator to be compatible with both full rate and half rate signals, and wherein the modulation includes offset modulation that reduces amplitude modulation.

20. The transmitter device of claim 16, wherein the 9QPR filter is configured to truncate side lobes and a portion of a main lobe of a frequency spectrum associated with the full rate signal.

* * * * *